Aug. 18, 1931.  E. D. EBY  1,819,881
SEMISTOP JOINT FOR FLUID FILLED CABLES
Filed Jan. 22, 1927
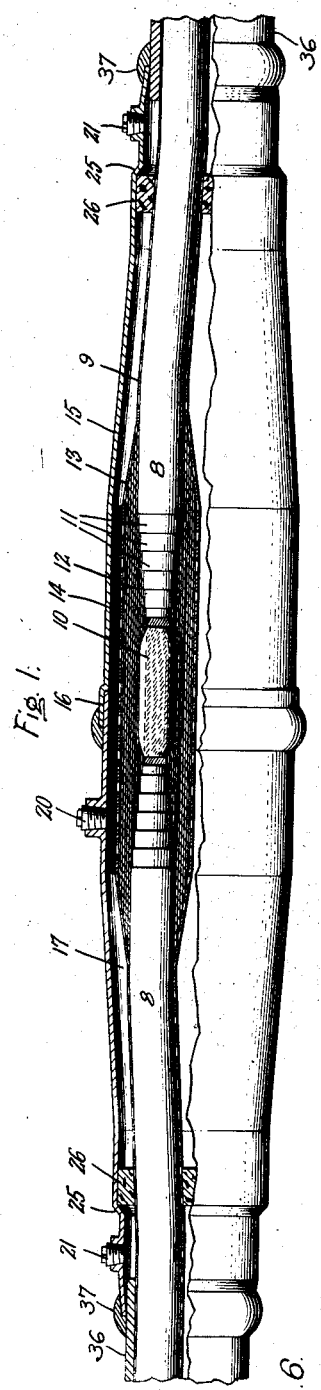
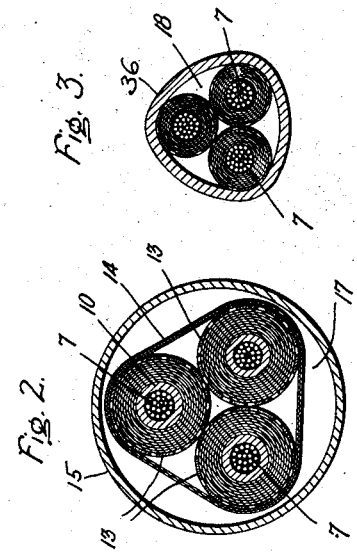
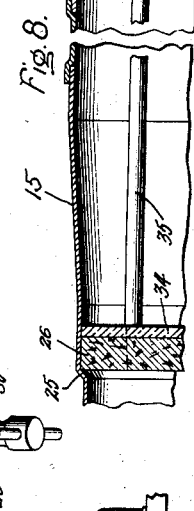
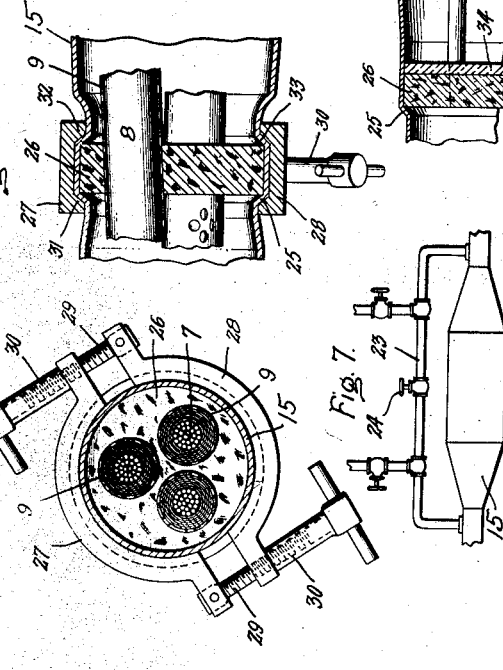
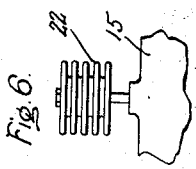
Inventor:
Eugene D. Eby,
by
His Attorney.

Patented Aug. 18, 1931

1,819,881

UNITED STATES PATENT OFFICE

EUGENE D. EBY, OF PITTSFIELD, MASSACHUSETTS, ASSIGNOR TO GENERAL ELECTRIC COMPANY, A CORPORATION OF NEW YORK

SEMISTOP JOINT FOR FLUID FILLED CABLES

Application filed January 22, 1927. Serial No. 162,888.

The present invention relates to sheathed high tension cables which are adapted to be located in underground conduits and in which a body of relatively thin insulating fluid such as oil is constantly maintained between the inner wall of said sheath and the paper or equivalent insulation which is wound directly on the conductor or conductors to ensure impregnation of the insulation.

It is necessary both for reason of manufacture and installation of the cable in the conduits to make the cable in pieces or sections and to unite or join the sections electrically and mechanically after being installed, the joints being located in suitably-disposed manholes. Such cables of necessity have to follow more or less closely the contour of the surface of the streets with the result that some portions are considerably higher than others. Also, it is desirable to maintain within the cable such a pressure on the oil or other insulating fluid as to cause it to completely fill all spaces or voids within the sheath. It follows from the foregoing considerations, that in order to prevent oil from being drained out of any considerable length of cable, should the sheath of the cable be ruptured or leak at some low point and also to permit of opening the cable joints at intermediate points for inspection or repair, it is necessary to provide what may be termed semi-fluid stop joints or dams at suitable points in the cable.

The object of my invention is to provide in fluid-filled cables, semi-stop joints or dams of improved construction which will effectively prevent fluid from one part or portion of the cable flowing into another part or portion.

For a consideration of what I believe to be novel and my invention, attention is directed to the accompanying description and to the claims appended thereto.

In the accompanying drawings which are illustrative of my invention, Fig. 1 illustrates a portion of a high tension three-conductor electric cable and a joint therefor, said joint being in partial section; Fig. 2 is a view in cross-section of the cable in the region of the joint; Fig. 3 is a cross-section of the cable sections beyond the joint; Fig. 4 is a sectional view of one of the fluid stop joints; Fig. 5 is a cross-sectional view showing a suitable means employed for forming the seat for the stop joint; Fig. 6 is a detail view showing a reservoir of a cable section; Fig. 7 shows a means for connecting two cable sections in series as regards the flow of fluid and Fig. 8 is a sectional view of a modified form of elastic dam.

I have shown my invention applied to a three-conductor cable since it is of special utility in connection therewith, but in the broader aspects thereof, it is not limited to any particular number of conductors.

7 indicates the conductors, each of which is composed of a number of rather small wires which are stranded to form a cable. Surrounding each conductor is a body of factory applied insulation 8 which is generally and preferably made of wound-on paper tape. Surrounding each conductor is a thin perforated metal ribbon 9, the purpose of which is to distribute or equalize the electrical stresses of the dielectric and transmit heat from the center to the outside. When assembled in the outer sheath 36 these ribbons are in contact with each other and the sheath as shown in Fig. 3. The ribbon is perforated to permit the fluid, usually oil, to freely penetrate the paper insulation on the conductors. By preference the perforations are so disposed that the resistance to the passage of eddy currents therein is equal in all directions. To accomplish this and to ensure freedom for the free passage of oil into the paper the perforations are made of equal size and uniformly spaced throughout the length of the ribbon, the section of the metal between any two adjacent perforations being the same. Instead of a perforated metal ribbon woven wire may be used, such for example as that used in making copper screening. In some cases the conductors may be wound with a ribbon for mechanical reasons, i. e. to increase the strength of the cable and prevent injury due to bending. The ends of each two adjacent conductors are united by a connector or sleeve 10, the sheath and paper insulation being removed for a short distance at the ends of the conductors for the purpose. To avoid the concentration of electrical stresses sharp corners on the connector should be avoided. The connector is secured to the conductors with solder to ensure good conductivity and thus avoid local heating.

The paper insulation is cut back from the connector by a series of steps 11, there being a shoulder between each two steps which reduces the longitudinal electrical stresses through the joint. After the joint is thus formed it is wound with tape 12 which may be made of paper, cloth or other suitable material and is of a character which is permeable to oil. The tape is wound around the joint layer by layer and as smoothly and evenly as possible to prevent voids. The jointer first winds the tape around the conductor in the space between the connector 10 and the factory wound insulation 8 should such a space exist, and then around the adjacent stepped portion of the insulation until the structure thus built up is level with the periphery of the connector after which the winding of the tape proceeds from end to end until finally it assumes the shape indicated in Fig. 1. As an alternative to the tape the joint may be wound by a tapered sheet of insulation. Over the joint thus taped is wound or wrapped a thin, perforated metal ribbon 13 which is of the same character as ribbon 9 and which electrically unites said ribbons 9 of the connected conductors. As the means for uniting each conductor is the same further description on this point is unnecessary. After the joints have been properly made and taped they are bound together by a wrapping of tape or equivalent material 14, as best shown in Fig. 2.

The joint or joints thus formed are enclosed by a metal casing 15 which is made in two or more pieces, the plane of division being perpendicular. As shown in Fig. 1 it is made of two pieces, one end being comparatively small and shaped to fit the lead sheath, the other end being large enough to surround the taped joint and leave an oil chamber. The meeting ends of the casing are preferably telescoped as at 16, after which they are united fluid tight by a wiped solder joint. The small ends of the casing are similarly united to the cable sheaths as indicated 37. The casing may be made of lead or it may be spun from a harder material such as brass or copper. From Fig. 2 it will be seen that an oil space or chamber 17 is provided around and between the joints and that said chamber extends beyond the ends of the joints as best shown in Fig. 1. It will also be seen from Fig. 3 that the cable proper as distinguished from the jointed portion has longitudinal passages or channels 18 in which a body of oil is maintained.

A filling opening for the casing is provided which may be closed by a plug 20 or it may be connected to a reservoir, standpipe or other device which will maintain the desired hydrostatic head. The casing is also provided with filling openings at opposite ends and through which oil is introduced into the channels of the cable proper. These openings may be closed by plugs 21 or one or both may be connected to a reservoir, standpipe or other source of fluid pressure. In Fig. 6 is shown a reservoir 22 connected to one of these openings and which a capable of expanding and contracting as the temperature of the oil changes. It will be observed that the sheaths stop short of the dams which will be described later, and near the ends of the casing so that fluid insulation can be freely supplied to the channels within the sheath, and will be prevented by the dams from flowing into the casing and through it to the other cable section. Should it be desirable for any reason to connect two sections of the cable in series as regards the flow of oil, the end openings in the casing may be connected by a pipe 23, and which may contain a shut off valve 24. I may supply oil to the casing and the conductor sections from the same reservoir or said parts may be supplied separately.

With the construction thus far described, it is evident that the joint cannot be inspected by opening the casing without first draining the oil from both of the cable sections and the casing. Also that a leak in any one of these parts will drain oil from all of them.

Having disclosed the construction and arrangement of the parts of the cable and joints, the necessity of a means for separating the oil chambers or passages one from the other to permit access thereto without undue loss of oil or to prevent drainage of a long length of cable in case of leakage through the lead sheath or casing is apparent. To accomplish this I employ compressible dams or disk-like stop joints wherever necessary. The casing is provided at each end with a shoulder 25 which forms a side seat for a dam or disk 26, the latter having as many openings or perforations as there are conductors. The wall of each opening makes a snug fit about the insulation on a conductor from which the sheath has been stripped and specifically with the perforated ribbon 9 which envelopes it. To attain the best results each dam or disk should be of good insulating material, tough and impervious to oil or practically so, have a reasonable degree of elasticity to permit of its being forced over the conductors to make friction fits therewith and to permit of its being seated on a shoulder when the parts are not exactly aligned, and to permit of its being compressed somewhat by pressure exerted at the periphery. In addition it should be of a character to act as a spacer for the several conductors and to receive and retain a small amount of varnish or equivalent material which assists in making the various joints oil-tight. Cork will be found suitable for the purpose especially when given a coating of suitable varnish.

These stop joint disks or dams have to be mounted on the several conductors before the joints are made and while the members of the casing are pushed back to expose the parts being worked on. After the joints are made the members of the casing are moved forward into place. To ensure proper seating of the disks on the shoulders they should be pushed along the conductors slightly beyond their respective positions so that when the casing members are closed by an endwise movement the disk will be properly seated on the shoulders 25. The capability of the disks to automatically seat themselves in the manner described is important for once the casing is closed there is no way to gain access to the interior to adjust them. To ensure a varnish coating inside of each conductor bore in the disks and also to facilitate slipping the disks into place it is desirable to varnish the outside of each conductor for a distance slightly greater than that which the disk has to be moved. After being positioned the outer surfaces of the disks may be again varnished to ensure a complete covering. Having properly seated the disks and closed the casing the next step is to compress the disks by exerting radial pressure thereon and also to secure them against accidental displacement, as from oil pressure for example. This may be done either before or after the casing members are soldered together and to the lead sheaths but usually it will be preferable to complete the soldering first. To compress the disks to seal the conductor channels from the casing chamber and to form a second shoulder or set for the sides of the disks adjacent the joints, a suitable clamp is used. As illustrated it comprises two semi-circular elements 27 and 28 each of which has a pair of lugs. In one lug of each element is a pivotally supported screw 29 which freely extends through the facing lug and enters a nut 30 which has a cross bar for turning it. The clamp has two inwardly-extending side flanges 31 and 32, the former substantially conforming in shape to the shoulder 25. On applying pressure to the clamp by means of the nuts 30 the wall of the casing is caused to conform to the shape of the inside of the clamp and thus forms a second shoulder 33 so that the disk is held between two shoulders, one on each side. This action also exerts sufficient radial pressure on the disk as to cause the walls of the orifices to snugly fit the conductors and to seat the periphery of the disk pressure tight. In using the clamp to form the second shoulder or to partly form the first shoulder as well it is desirable to do so by successive operations to prevent bulging at one or more points. This can be accomplished by setting the clamp in one position and applying pressure, then releasing the clamp, adjusting it angularly and again applying pressure. This action is repeated until the shoulders are fully formed. The clamp may be left on the cable permanently or removed, as desired.

Should it be desirable for any reason to make the casing of harder metal than lead and of such thickness that it would not readily respond to the action of clamps as previously mentioned, the construction shown in Fig. 8 may be employed. In this form of the invention, an elastic dam such as a perforated cork disk 26 is provided as before, one side of which is seated on the shoulder 25 formed on the casing. The diameter of the disk is such that it makes a forced fit with the inner wall of the casing and hence the disk as a whole is under radial compression as before. To ensure the necessary pressure on the disk to hold it on its seat and to cause firm contact at its periphery with the inner wall of the casing, a stiff insulating disk 34 as of fiber for example, is provided which rests on the inner face of the disk and through which the conductors extend. Pressure is exerted on the side face of the elastic dam by the disk and axial pressure is exerted on the disk by means of one or more rods 35 which are forced into the space between the two disks 34 located at opposite ends of the casing. The rods may be made of hard fiber or wood and are of such length as to ensure firm seating of both dams on the casing shoulders and the seating of the disks on the dams. Where a single rod is used it may be located in the triangular space between the three joints. Where three such rods are employed they may advantageously be inserted in place about the joints before the wrapping 14 is applied to bind the joints together, as shown in Fig. 2. This binding will serve as a means to prevent accidental displacement of the rods.

What I claim as new and desire to secure by Letters Patent of the United States, is:

1. A fluid-filled cable, comprising insulated conductor sections, joints for uniting similar conductors of the sections, a perforated metallic wrapping for each of the conductors and their joint to equalize the dielectric stresses and transmit heat, a sheath for each of said sections, a chambered casing for the joints, compressible disks which are seated in the casing near its ends on opposite sides of the joints and have openings through which the conductors extend, the walls of each opening making a tight fit with the perforated wrapping on each conductor.

2. A fluid-filled cable comprising insulated conductor sections, joints for uniting similar conductors of the sections, a sheath for each section, a chambered casing for the joints, cork disks located near the ends of the casing to prevent transfer of fluid from one part of the cable to another, and means formed by the casing walls for compressing the disks on the conductors by radial pressure.

3. A fluid-filled cable comprising sections, each of which has an insulated conductor and an air-tight sheath, a connector for uniting the adjacent ends of the conductors, a body of insulation which surrounds the connector and also the adjacent ends of the conductors, a casing which encloses the connector and its insulating covering and tapers from the central portion toward both ends, fluid-tight means for connecting the ends of the casing to the sheaths, and a pair of dams located one on each side of the connector and its covering which make fluid-tight connections with the insulation of the conductors and also with the inner wall of the casing near the ends thereof.

4. In a stop-joint for oil-filled cables, the combination of a pair of conductors, each conductor having a covering of factory-applied insulation, an enclosing fluid-tight sheath and a body of relatively thin oil in which the insulation and conductor are immersed, a metallic connector which electrically connects the ends of the adjacent conductors, a body of insulation which encloses the connector and also the portions of the factory-applied insulation adjacent thereto, a casing which encloses the connector and its insulation and is sealed to the sheaths of both conductors, and a pair of disks situated between the parts of the conductors from which the sheaths have been removed and through each of which a conductor and its factory-applied insulation extends, the wall defining the bore of each disk being seated fluid-tight about said insulation, and the peripheral portion of each of said disks making a fluid-tight fit with the casing to prevent the free flow of oil between the interiors of a sheath and the casing.

5. In a stop-joint for oil-filled cables, the combination of conductor sections, each comprising a number of conductors arranged side by side, each conductor having a covering of factory-applied insulation, an enclosing fluid-tight sheath, said insulation and sheath defining longitudinal passages, a body of oil in the passages which also permeates the insulation, connectors for uniting the respective pairs of conductors, insulating coverings for each of the connectors and the adjacent portions of the factory-applied insulation, a casing which encloses the connectors and their insulations and has its ends sealed to the sheaths, disks located within the casing which have spaced openings through which the insulated portions of the conductors extend and are separated thereby, the walls defining said openings being seated fluid-tight about the conductor insulations, the peripheral portions of said disks making fluid-tight engagement with the inner wall of the casing to prevent the free transfer of oil between the chamber within the casing and the interior of the sheaths.

6. In a high tension oil-filled cable, the combination of conductor sections each comprising a number of separately insulated conductors arranged side by side, a sheath and a body of relatively thin oil, connectors for electrically connecting the respective conductors, insulating coverings for the connectors and the adjacent ends of the conductor insulators, a perforated metallic wrapping for each pair of connected conductors and their insulators to distribute the dielectric stresses, a casing which surrounds the connectors and is sealed at its ends to the sheaths, and a pair of spaced disks for preventing the flow of oil from one section to another which are located beyond the ends of the connectors and their insulations and are fitted pressure-tight within the casing, said disks having openings in which the conductors are snugly fitted and spaced apart.

7. In a high tension oil-filled cable, the combination of conductor sections, each comprising three separately insulated conductors arranged side by side and in contact with each other, a sheath and a body of insulating fluid confined by the sheath, connectors for uniting corresponding conductors, insulating coverings for the connectors, a metallic wrapping applied over the insulations of each connected pair of conductors and their joints, said wrappings being in electrical contact with each other and with the sheaths, a casing which encloses the connectors and also adjacent portions of the conductors and is sealed to the sheaths, and means located within the casing and near its ends which prevent the free transfer of insulating fluid from one sheath to the other.

8. A cable comprising insulated conductors, a fluid filled enclosure for the conductors which of itself prevents the escape of fluid or the admission of moisture, a pair of spaced compressible disks located within the enclosure which make fluid tight joints about the insulation on the conductors and also with the inner wall of the enclosure to prevent the flow of fluid from one side of a dam to the other, and means forming a part of the enclosure for holding the disks under radial compression.

9. A high tension cable comprising a pair of conductor sections, each section comprising more than two separately insulated conductors, a sheath for each section, there being fluid containing channels between the insulation on the conductors and the sheaths, the sheaths being removed from the adjacent ends of the sections to expose the insulation, a chambered casing, the ends of which are sealed fluid tight to the sheaths to form therewith a continuous fluid containing enclosure, compressible elastic disks through which the insulated ends of all the conductors extend and are held in spaced relation thereby, said disks being held under radial compression by the inner wall of the casing to prevent the free flow of fluid from the channels of one sheath to those of the other, and an insulated connector for each corresponding pair of conductors, all of which are located between the disks.

10. A cable comprising sections each having a number of separately insulated conductors, conducting means wound over each body of insulations to equalize the dielectric stresses, connectors for electrically uniting corresponding conductors of the sections, insulation for each connector, conducting means wound over the body of insulation on each connector to equalize the dielectric stresses, the last named means being in electrical connection with the first, a sheath for each section which contains fluid insulation, a portion of each sheath being removed to expose the conductors and other parts, a casing for the connectors which is hermetically sealed at its ends to the adjacent ends of the sheaths, and means within the casing and between the opposed ends of the sections from which the sheaths have been removed for jointing purposes which prevent the flow of fluid insulation from one section to the other.

11. A fluid filled cable comprising insulated conductor sections immersed in the fluid, a sheath for each of the sections, a chambered casing, means for uniting the ends of the casing with the ends of the sheaths to form fluid tight joints, and a compressible disk located at one end of the chamber in the casing beyond the end of the sheath which is held in compression by the inner wall of the casing and through which an insulated portion of a conductor extends and is tightly seated therein, whereby fluid is prevented from flowing from one side of the disk to the other.

12. A fluid filled cable comprising insulated conductor sections immersed in the fluid, sheaths for the conductors, a chambered casing, means for uniting the ends of the casing with the ends of the sheaths to form fluid tight joints, a fluid stop joint which comprises a disk of compressible insulating material located within the chamber of the casing beyond the end of the sheath and having a bore through which an insulated portion of a conductor extends, the wall of the bore being radially compressed around the conductor, and a shoulder on the casing which engages the disk, the inner wall of the casing holding the disk under radial compression.

13. A fluid filled cable comprising insulated conductor sections immersed in the fluid, a connector therefor, a sheath for each of the conductors, a chambered casing for the connector, a compressible disk through which an insulated portion of a conductor extends and which is tightly fitted therein, and shoulders formed on the casing which engage opposite sides of the disk, the inner wall of the casing between the shoulders exerting radial inward pressure on the disk to hold it in compression to restrict the passage of fluid insulation from one side to the other.

14. A fluid filled cable comprising sections, each of which has a number of conductors covered with insulation immersed in liquid insulation, a sheath for each of the sections, connectors for uniting corresponding conductors of the sections, insulating coverings for the connectors, a casing for the connectors containing an enlarged chamber, means for sealing the ends of the casing to the ends of the sheaths, a perforated disk of compressible material located at one side of the connectors and through which the insulated portions of the conductors of one of the sections extend in spaced relation, the walls of the perforations closely fitting the peripheral surfaces of the conductor coverings, and means formed by the wall of the casing for exerting compression pressure on the disk to prevent fluid from flowing through the perforations and over the periphery of the disk into the chamber of the casing.

15. A fluid filled cable comprising insulated conductor sections immersed in the fluid, a sheath for each section, a connector for uniting the conductors, an insulated covering for the connector, a chambered casing for the connector, means for sealing the ends of the casing to the ends of the sheaths, perforated compressible disks of insulating material located near the ends of the casing on opposite sides of the connector and adjacent the ends of the sheaths, said conductors extending through and being tightly fitted in the perforations, and means formed by the casing wall for maintaining the disks in position, and exerting inward pressure to hold the disks under compression in spaced relation, said disks preventing the flow of fluid between the conductor sections and the chamber.

16. A fluid filled cable comprising conductor sections, insulating covers therefor immersed in the fluid, a metallic sheath for each section, the sheaths being stripped from the adjacent ends of the sections to expose the coverings, a connector for the conductors, insulation which covers the connector and adjacent insulated ends of the conductors, a chambered casing which encloses the connector, means for securing the ends of the casing to the adjacent ends of the metallic sheaths, compressible disks located near the ends of the casing which divide the casing into a central and two end chambers all of which are filled with fluid and through which disks the stripped ends of the individual conductors extend, said disks making fluid tight joints with the conductor coverings and with the inner wall of the casing, and means on the casing through which the said chambers can independently be supplied with fluid.

17. A fluid filled cable comprising sheathed conductor sections, each of said sections having three insulated conductors with channels between them and the sheath, containing fluid which permeates the insulation, an electrostatic shield applied over the insulation of each of the conductors, connectors for electrically uniting the corresponding conductors of the sections, insulated coverings for the connectors and the adjacent ends of the conductors, a binding means wrapped around the insulation of the connectors, a chambered casing in which the connectors are located, means connecting the ends of the casing to the sheaths, and perforated compressible disks of insulating material located on opposite sides of the connectors, through which the insulated conductors extend, said disks being compressed radially by the inner wall of the casing to prevent the flow of fluid between the channels and the chamber of the casing.

18. A fluid filled cable comprising conductor sections, insulating covers therefor which are immersed in and are permeable to the fluid, a metallic sheath for each section, the sheaths being stripped from the adjacent ends of the sections to expose said covers, a metallic connector for uniting the conductor ends, a body of insulation applied to the connector and adjacent parts of the covers on the conductors, a chambered casing which encloses said body and the ends of the sheaths, means for uniting the casing ends to the metallic sheaths by fluid tight joints, a pair of dams which divide the interior of the casing into a central and end chambers and prevent the free flow of fluid from one to the other, a conduit for connecting the cable sections in series as regards the flow of fluid, and valve means in said conduit for controlling the passage of fluid therethrough.

In witness whereof I have hereunto set my hand this 18th day of Jan., 1927.

EUGENE D. EBY.